United States Patent [19]

Pezzuto, Jr.

[11] 4,100,125

[45] * Jul. 11, 1978

[54] SEAMLESS FLOORING AND METHOD AND COMPOSITIONS FOR MAKING SAME

[75] Inventor: Michael Pezzuto, Jr., Burlington, Mass.

[73] Assignee: Beatrice Foods Company, Wilmington, Mass.

[ * ] Notice: The portion of the term of this patent subsequent to Jul. 11, 1995 has been disclaimed.

[21] Appl. No.: 706,783

[22] Filed: Jul. 19, 1976

Related U.S. Application Data

[63] Continuation of Ser. No. 358,029, May 7, 1973, abandoned, which is a continuation of Ser. No. 72,672, Sep. 16, 1970, abandoned.

[51] Int. Cl.$^2$ .................. C08L 13/02; C08L 31/02
[52] U.S. Cl. .................. 260/29.6 TA; 260/29.6 H; 260/29.6 MH; 260/32.8 R; 260/33.4 R; 260/33.6 UA
[58] Field of Search .................. 260/29.6 TA, 29.6 H, 260/29.6 MH, 32.8 R, 33.4 R, 33.6 UA

[56] References Cited

U.S. PATENT DOCUMENTS

| | | | |
|---|---|---|---|
| 3,057,812 | 10/1962 | Straughan et al. | 260/29.6 TA |
| 3,085,907 | 4/1963 | Zdanowski et al. | 260/29.6 H X |
| 3,106,486 | 10/1963 | Harren et al. | 260/29.6 TA X |
| 3,284,394 | 11/1966 | Suen et al. | 260/29.6 H |
| 3,317,493 | 5/1967 | Selby | 260/29.6 TA X |
| 3,532,654 | 10/1970 | Finn et al. | 260/29.6 TA X |
| 3,666,521 | 5/1972 | Weyna et al. | 260/29.6 TA X |

*Primary Examiner*—Lucille M. Phynes
*Attorney, Agent, or Firm*—Wolf, Greenfield & Sacks

[57] ABSTRACT

Seamless flooring comprising layers of an acrylic polymer applied from a latex including one or more layers of intermediate plastic chips, the method of making the same, and film-forming latex compositions for making the same consisting of an aqueous emulsion of a methacrylic polymer in combination with a solvent.

6 Claims, 6 Drawing Figures

SEAMLESS FLOORING AND METHOD AND COMPOSITIONS FOR MAKING SAME

RELATED APPLICATION

This application is a continuation of application Ser. No. 358,029 filed May 7, 1973 and now abandoned which is a continuation of application Ser. No. 72,672 filed Sept. 16, 1970 and now abandoned.

My invention relates to seamless flooring, and to methods and compositions for making the same.

A demand has been developed for decorative, durable seamless flooring of a sort which can be applied over a suitable sub-floor in the form of a liquid, rather than in the form of sheets, rolls, or tiles. It would be desirable for such flooring to be applicable with an ordinary roll coater, of the kind commonly employed for painting. For that purpose, a coating composition is desirable with which a relatively thick flooring can be built up with a few coats. The final coating should be quick-drying, durable, colorfast and preferably recoatable.

A number of compositions have been developed for making seamless flooring. One such composition is a curable polyurethane which includes reactive components that will crosslink upon drying. The urethane film produced with this composition has excellent properties when newly applied. However, it has a pronounced tendency to yellow with age. And it is not practical to recoat it after it has been installed for a short period of time. Moreover, the curable urethane necessarily includes an odiferous and toxic solvent, requiring precautions that would preclude its use in many environments, and would in any case require skilled labor for installation. Finally, after application and drying, the curable urethane solvent systems cannot be recoated with a fresh coat without elaborate preparation of cleaning and sanding to obtain good adhesion.

Another known method for making seamless flooring involves the use of an acrylic solvent system. The solvents required are toxic, inflammable and odorous. Such solvent systems are not particularly suitable for industrial use, and are definitely unsuitable for amateur use.

It would be most desirable to apply seamless flooring in the form of an aqueous emulsion or suspension, i.e., a latex. However, conventional film-forming latices are not suitable for the manufacturing of seamless flooring because the films formed are too soft, and do not have adequate durability. In addition, conventional latex systems foam excessively, to the extent that it is difficult to apply them with a roller.

Another approach to the seamless flooring problem has been to attempt to make film flooring latices with harder polymers, by the use of plasticizers and coalescing agents. The difficulty is that with conventional systems, the plasticizers and coalescing agents remain in the film, and prevent it from hardening to its desired hardness and durability in a practical length of time. The object of my invention is to facilitate the manufacture of seamless flooring from principally aqueous media that is colorfast, durable, recoatable, and develops proper hardness so that it can be used in a practical length of time.

My invention is based on the discovery that certain high molecular weight polymers, comprised principally of methacrylates, are not plasticized by solvents to the extent that one would expect. Formerly, it was thought that the key to the manufacture of a successful latex for laying down a polymer film of relatively high hardness was to find a hard polymer with rapid solvent release characteristics. In other words, the idea was to use a high molecular weight polymer in a stable aqueous latex, with sufficient solvent for the polymer to make it film-forming, and to choose the polymer so that the solvent would be released rapidly after the latex was spread on the floor, to reach the final hardness desired. The trouble with that approach is that polymers tend to retain solvent longer than is normally expected, particularly in thick layers. The result was either a latex that would dry in a convenient time but not to sufficient hardness, or one that would dry to a sufficient hardness, but not in a practical length of time, especially for floor applications. The compositions of my invention are not outstanding in their solvent release properties, but are surprisingly satisfactory for laying down hard films because they dry to a useable hardness in a relatively short time.

Briefly, my invention is practiced by making a copolymer that principally consists of methacrylates, with a minor amount of acrylic acid or methacrylic acid, copolymerized by emulsion polymerization to a high molecular weight; i.e., from about $4 \times 10^5$ to about $2 \times 10^6$. As a practical matter, the extent of polymerization is judged either by the Sward hardness of the polymer, which should be between 35 and 45, or in terms of the glass transition temperature (the temperature at which a polymer changes from the glassy state to the elastomeric or plastic state), which should ideally be between 35° and 55° C.

Either before the polymerization is carried out, or afterward, sufficient solvent is added so that the polymer will form a film upon drying. The aqueous film forming latex so produced is applied to a suitably prepared floor with a conventional paint roller. Preferably, several coats, each 8 to 10 mils in wet thickness, are laid down to produce the final dried thickness of between 25 and 35 mils.

Following the application of one of the coats, and before it is dried, I prefer to sprinkle colored plastic chips over the wet surface and to roll them in with the paint roller. Subsequent coats of clear latex are then applied. The combination of the clear layers with the internally distributed colored plastic chips produces an attractive decorative effect. The latex can be applied without chips in one or two coatings to set as a protective coating for existing floors.

Polymers useful in the practice of my invention are made from monomers consisting of methyl methacrylate or n-butyl methacrylate, or admixtures of the two in any proportions, together with from 1 to 5 percent by weight of acrylic acid or methacrylic acid. The acid monomer contributes stability to the emulsion and hardness to the ultimate film. One preferred composition is 23 parts by weight of methyl methacrylate, 72 parts by weight of n-butyl methacrylate, and 5 parts by weight of acrylic acid. Surprisingly, the inclusion of any appreciable amount of acrylate monomers; such as ethyl or methyl acrylate, produces a polymer that is useless for the purposes of my invention. Such polymers, including acrylates, may be made to the same hardness and to exhibit the same solvent release properties. However, when plasticized with enough solvent to make them film-forming from an aqueous latex, they will not harden quickly enough to be useful. On the other hand, up to fifteen percent by weight of a vinyl ester, such as vinyl acetate, or of acrylonitrile, can be included without appreciably affecting the hardening properties of the solvent-polymer system, although they do have a tendency to discolor and are undesirable when discoloration is a problem.

The plasticizing solvent may be added to the aqueous monomer system before polymerization, or it may be stirred in after polymerization. The solvent should be selected to have a higher boiling point than water, so that it will leave the film after the water has evaporated from the latex. Of course, the boiling point should not be so high as to unduly prolong drying. Preferably, the boiling point should be in the range of 212° to 400° F. The solvent can be either soluble or insoluble in water. Various suitable solvents are aromatic hydrocarbons, such as xylenes, chlorinated solvents, esters, ketones and alcohols. Cellulose acetate may be used. Preferred solvents are the commercial high boiling petroleum fractions, such as Solvesso 100, a naptha boiling in the range of 311°-344° F, as made and sold by the Humble Oil Corporation, and AMSCO Super High Flash Naptha, boiling in the range of 318°-345° F and made and sold by the Amsco Division of Union Oil Co. of California. Another excellent solvent is a mixture of Solvesso 100 and diacetone alcohol in which diacetone alcohol predominates. These solvents act not only as film forming agents, but also as defoamers to facilitate roller application.

Plastic chip useful in the practice of my invention include those conventionally used for decorative effect in laminar plastic materials. Typically, they are made from a latex paint composition, such as a vinyl acetate latex, highly loaded with pigment to form relatively fragile colored chips 3 to 5 mils in thickness. Since they do not contribute to the strength of the flooring and are embedded in an acrylic matrix in use, their physical properties are not critical. The chemical properties of the chips are also unimportant, so long as they are relatively inert, as are all such materials that would be commonly employed.

The preferred practice of my invention will best be understood in the light of the following detailed description, together with the accompanying drawings, illustrating the invention and the discovery about which it is organized.

In the drawings, FIG. 1 is a graph illustrating the drying chracteristics of a polymer suitable for use in accordance with my invention in comparison with two chemically similar polymers of essentially the same drying properties and ultimate hardness, but which are not suitable for the practice of my invention;

The following examples illustrate the difference in the hardening properties of film forming compositions in accordance with my invention as compared with apparently chemically similar materials that do not exhibit the same hardening properties.

EXAMPLE I

A methacrylic polymer was made by conventional emulsion polymerization, with a peroxidic phosphate initiator, to a glass transition temperature of approximately 47° C. The composition of the monomers used, in parts by weight, was as follows:

| Methyl Methacrylate | 37.0 |
|---|---|
| n-Butyl Methacrylate | 62.0 |
| Methacrylic Acid | 1.0 |

The Sward hardness of this polymer was 44.

EXAMPLE II

An acrylic-methacrylic polymer was made in the same manner as in Example I, to a glass transition temperature of approximately 47° C. The composition of the monomers used, in parts by weight, was as follows:

| Methyl Methacrylate | 62.4 |
|---|---|
| Ethyl Acrylate | 36.6 |
| Methacrylic Acid | 1.0 |

The Sward hardness of this polymer was 44.

EXAMPLE III

A methacrylic emulsion polymer was made in the same manner as in Examples I and II above, to a glass transition temperature of about 40° C. The composition of the monomers used, in parts by weight, was as follows:

| n-Butyl Methacrylate | 72.5 |
|---|---|
| Methyl Methacrylate | 25.0 |
| Acrylic Acid | 2.5 |

The Sward hardness of this polymer was 40.

EXAMPLE IV

An acrylic-methacrylic emulsion polymer was made in the same manner as in Examples I-III above, to a glass transition temperature of approximately 40° C. The composition of the monomers used, in parts by weight, was as follows:

| Methyl Methacrylate | 57.5 |
|---|---|
| Ethyl Acrylate | 40.0 |
| Acrylic Acid | 2.5 |

The Sward hardness of this polymer was 40.

Figure 1:
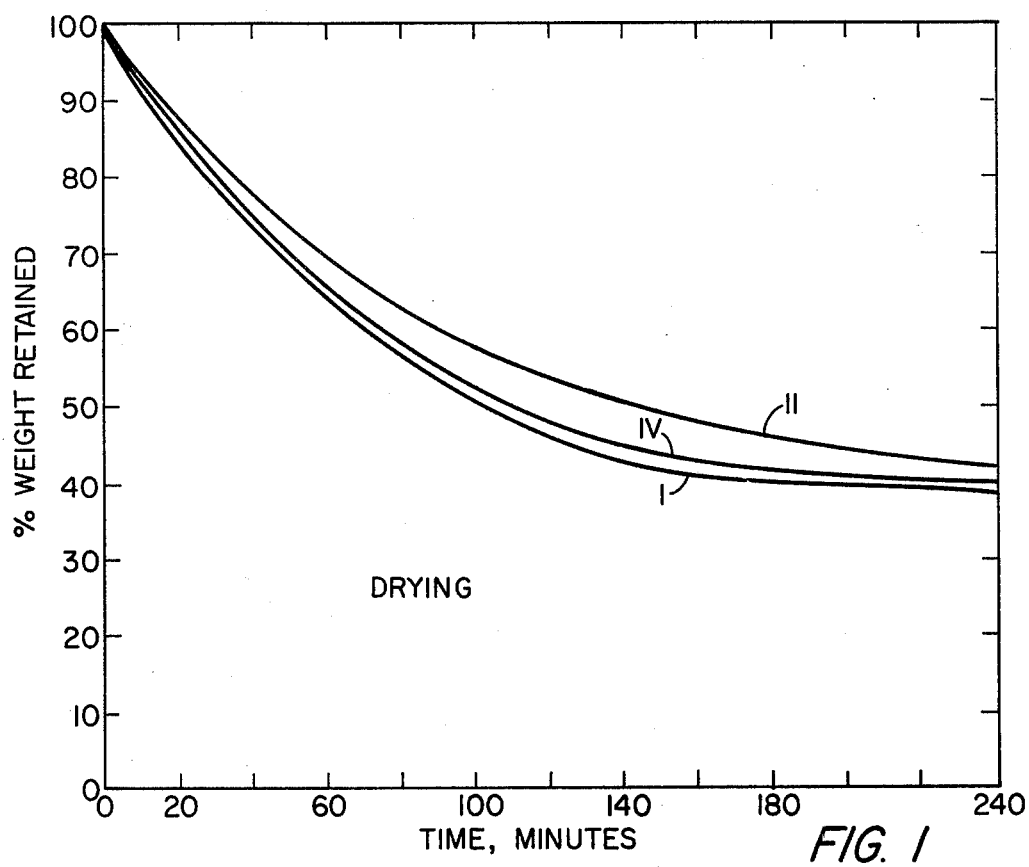

The Polymers of Example I through IV were dissolved in various solvents, and their solvent release rates compared. Very little difference in the solvent release properties of polymers I, II, III and IV was noted when dissolved in xylene or Solvesso 100. Typical data is shown in FIG. 1 for polymers I, II and IV. In FIG. 1, the percent by weight of solvent retained is plotted as a function of time, when 30 percent by weight solutions of the polymers in xylene were exposed to the atmosphere at room temperature in watch-glasses.

Figure 2:
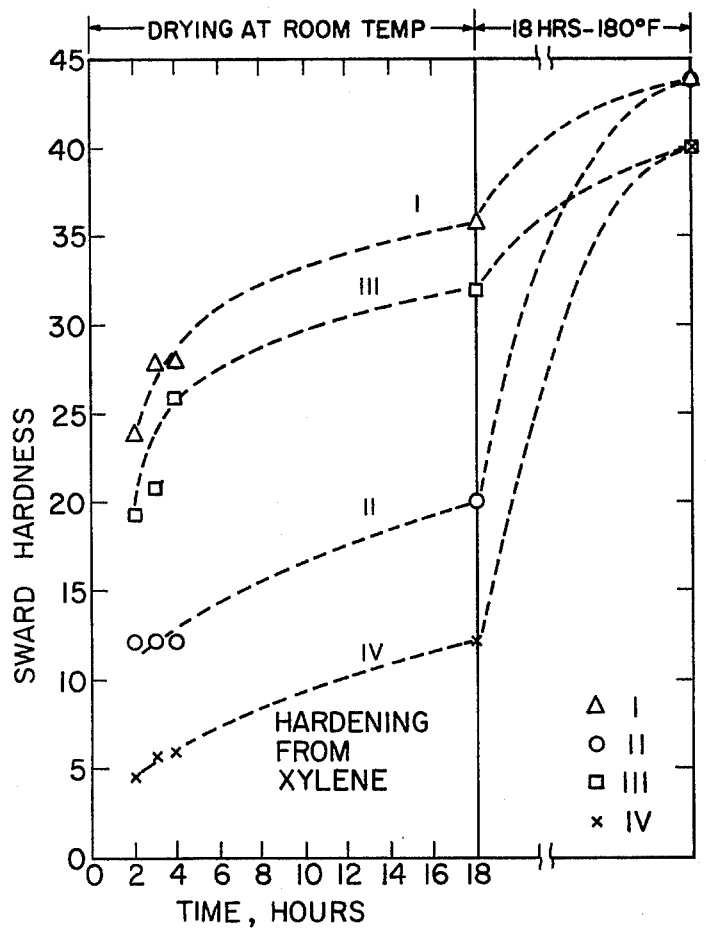
FIG. 2 is a graph illustrating the hardening of two polymers in accordance with my invention as compared with two other polymers of similar ultimate hardness upon evaporation of one solvent from the polymers.

FIG. 2 shows the hardening behavior of films cast from solutions of the polymers of Examples I through IV. They were initially 30 percent by weight of solids in xylene. The Sward hardnesses of the films were measured after 2, 3, 4 and 18 hours, while the films were dried at room temperature in the atmosphere. The films were then baked for 18 hours at 180° F. Baking under those conditions essentially brings the films to their ultimate hardness.

In the preparation of seamless flooring, a film must reach a Sward hardness somewhere between 20 and 25 before any appreciable floor traffic can be imposed without damaging the film. The polymers of Examples I and III, which contain methacrylates and no acrylates, reached hardnesses well above this range after 18 hours at room temperature. On the other hand, the apparently similar polymers of Examples II and IV were still much too soft after 18 hours at room temperature, in spite of the fact that the percentage of retained solvent in all of the polymers of Examples I through IV would be substantially the same. As will be apparent from FIG. 2, the polymers of Examples I and III exhibit surprisingly superior solvent tolerance characteristics.

Figure 3:
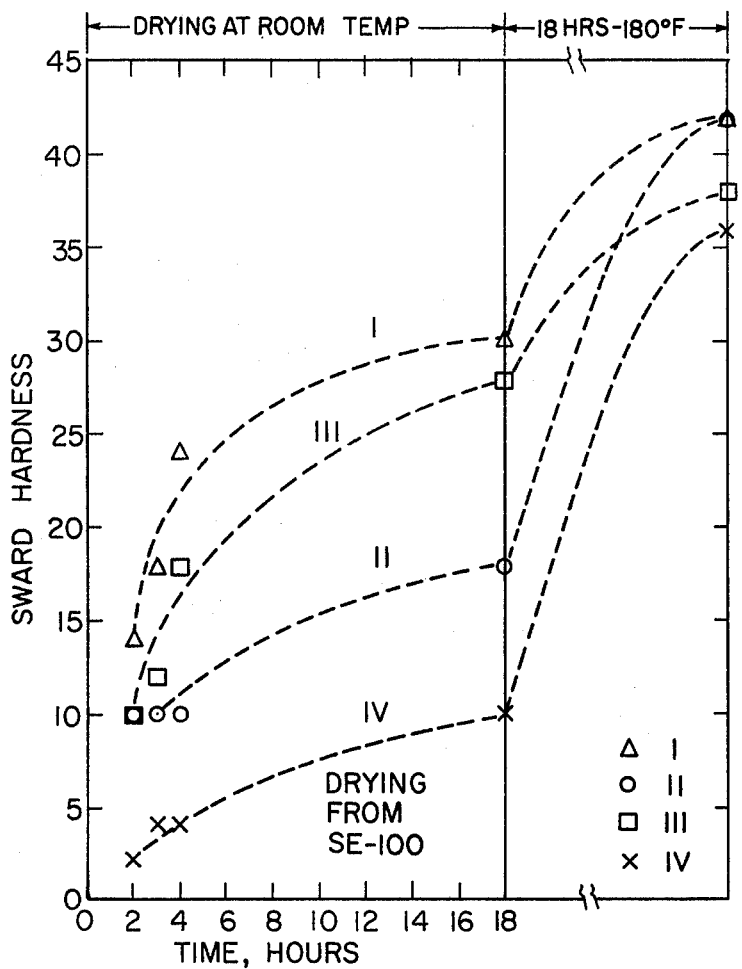
FIG. 3 is a graph illustrating the hardening of the polymers of FIG. 2 upon evaporation of another solvent.

FIG. 3 shows the behavior of the polymers in Examples I through IV upon drying from 30 percent by weight solids solution in Solvesso 100, abbreviated in FIG. 3 as SE-100. As in the examples illustrated by FIG. 2, the polymers in accordance with Examples I and III reached hardnesses quite suitable for heavy floor traffic after 18 hours, whereas the polymers in accordance with Examples II through IV still are much too soft after 18 hours drying at room temperature.

The film-forming ability of the compositions of my invention is dependent on the plasticizing effect of the solvent on the polymer, and also on the relative rates at which the water and solvent evaporate after the composition has been coated on the desired substrate. The film-forming ability of the composition as a function of the choice of solvent is illustrated in Examples V through XXIII, summarized in Table I below. These examples comprise solvent compatability tests made on a latex of the presently preferred composition.

Specifically, the latex consisted of 40 percent by weight of solids in water. The solids consisted of a copolymer of the preferred composition of 23 parts by weight of methyl methacrylate, 72 parts by weight of n-butyl methacrylate, and 5 parts by weight of acrylic acid.

To this latex was added, with stirring, various amounts of the different solvents. For example, in Example V the solvent was SE-100. Three runs were made, one with 20 percent SE-100, one with 30 percent by weight SE-100, and one with 40 percent by weight of SE-100. In Table I, the numbers under the heading of "percent solvent" are percentages by weight of solvents based on the weight of polymer in the latex.

The initial stability of the dispersion upon stirring the solvent into the latex was recorded as one of three results. In Table I, under "initial stability", the number 1 means that precipitation, commonly termed "kick-out", occured upon stirring in the solvent. The number 2 means that a sediment was formed, and the number 3 means that the dispersion was initially stable. Obviously, only a solvent that formed an initially stable dispersion with the latex would be suitable for the purposes of my invention. The mixtures of solvent and latex were then drawn down on glass plates with a 3 mil draw-down bar in patches each about 2 by 5 inches, and air-dried.

The film-forming capabilities of the various compositions are listed under "film-formation" in Table I in terms of five catagories numbered from one to five. The number 1 means that no film was formed and that the evaporation product was essentially a powder. The number 2 means that a cracked film was formed. The number 3 means that a borderline film, i.e., one that was clear in the center of the test patch, but cracked at the edges, was formed. The number 4 means that a useful continuous film was formed. The number 5 signifies that a tacky film was formed in which the plasticizing power of the residual solvent was excessive, resulting in a film that was too soft. Only these compositions for which the number 4 was listed would be satisfactory for the purposes of my invention.

TABLE I

| Example | Solvent | Per Cent Solvent | Initial Stability | Film Formation |
|---|---|---|---|---|
| V | SE-100 | 20 | 3 | 3 |
|  |  | 30 | 3 | 4 |
|  |  | 40 | 3 | 4 |
| VI | Isopropyl Acetate | 10 | 3 | 1 |
|  |  | 20 | 3 | 1 |
|  |  | 30 | 3 | 1 |
|  |  | 40 | 3 | 1 |
| VII | Xylene | 10 | 3 | 1 |
|  |  | 20 | 3 | 2 |
|  |  | 30 | 3 | 3 |
|  |  | 40 | 3 | 4 |
| VIII | Methyl Cellosolve | 10 | 2 | 1 |
|  |  | 20 | 2 | 1 |
|  |  | 30 | 2 | 1 |
|  |  | 40 | 2 | 1 |
| IX | Toluene | 10 | 3 | 1 |
|  |  | 20 | 3 | 2 |
|  |  | 30 | 3 | 3 |
|  |  | 40 | 3 | 4 |
| X | Benzene | 10 | 3 | 1 |
|  |  | 20 | 3 | 1 |
|  |  | 30 | 3 | 2 |
|  |  | 40 | 3 | 2 |
| XI | Carbitol Acetate | 10 | 1 | 4 |
|  |  | 20 | 1 | 5 |
|  |  | 30 | 1 | 5 |
|  |  | 40 | 1 | 5 |
| XII | Diisobutyl Ketone | 10 | 3 | 1 |
|  |  | 20 | 3 | 1 |
|  |  | 30 | 3 | 1 |
|  |  | 40 | 3 | 3 |
| XIII | Ethyl Acetate | 10 | 2 | 4 |
|  |  | 20 | 2 | 1 |
|  |  | 30 | 2 | 1 |
|  |  | 40 | 2 | 1 |
| XIV | Cellosolve Acetate | 10 | 1 | 1 |
| XV | Amyl Acetate | 10 | 3 | 1 |
|  |  | 20 | 3 | 1 |
|  |  | 30 | 3 | 1 |
|  |  | 40 | 3 | 1 |
| XVI | Synasol | 10 | 3 | 1 |
|  |  | 20 | 3 | 1 |
|  |  | 30 | 3 | 1 |
|  |  | 40 | 3 | 1 |
| XVII | Butyl Cellosolve | 10 | 1 | 3 |
|  |  | 20 | 1 | 3 |
|  |  | 30 | 1 | 3 |
|  |  | 40 | 1 | 3 |
| XVIII | 2-Ethyl Hexanol | 10 | 3 | 3 |
|  |  | 20 | 3 | 5 |
|  |  | 30 | 3 | 5 |
|  |  | 40 | 3 | 5 |
| XIX | Diacetone Alcohol | 10 | 3 | 3 |
|  |  | 20 | 1-2 | 4 |
|  |  | 30 | 1-2 | 4 |
|  |  | 40 | 1-2 | 4 |
| XX | Isopropyl Alcohol | 10 | 1 | 1 |
|  |  | 20 | 1 | 1 |
|  |  | 30 | 1 | 1 |
|  |  | 40 | 1 | 1 |
| XXI | Butyl Cellosolve Acetate | 10 | 3 | 4 |
|  |  | 20 | 3 | 4 |
|  |  | 30 | 3 | 4 |
|  |  | 40 | 3 | 4 |
| XXII | Diisobutyl Carbitol | 10 | 3 | 1 |
|  |  | 20 | 3 | 3 |

TABLE I-continued

| Example | Solvent | Per Cent Solvent | Initial Stability | Film Formation |
|---------|---------|------------------|-------------------|----------------|
|         |         | 30               | 3                 | 4              |
|         |         | 40               | 3                 | 4              |
| XXIII   | Equal parts by wt. of Butyl Cellosolve Acetate and SE-100 | 10 | 3 | 1 |
|         |         | 20               | 3                 | 4              |
|         |         | 30               | 3                 | 4              |
|         |         | 40               | 3                 | 4              |

Referring to Table I, the most desirable solvent was SE-100 illustrated in Example V above. At somewhat above 20 percent by weight, based on the weight of polymer, a good film was formed and the dispersion was stable. As shown in Examples XXI, XXII, and XXIII, cellosolve acetate, equal parts of cellosolve acetate and SE-100, and diisobutyl carbitol are suitable solvents. The fact that pure SE-100, pure celluosolve acetate, and an equal mixture of them are useful, indicates that they would be useful in any proportions.

Examples VI, VIII, XII, XIV, XV, XVI, XVII, and XX were completely unpromising. Examples VIII, IX, and X illustrate solvents that were too fugitive. In relatively small amounts, these solvents almost entirely evaporate before the water evaporates, and thus have no plasticizing effect. Benzene, as shown in Example X, showed this tendency to such an extent that no useful film can be cast with its aid from an aqueous suspension. Sufficient amounts of xylene and toluene, as in Example VII and IX, could overcome this effect, but on the whole, these solvents are not desirable for use in the compositions of my invention. As illustrated in Example XI, carbitol acetate exhibits too much solvent power, causing precipitation, and results in films that are too soft. 2-ethyl hexanol, as in Example XVII could be employed, but have a tendency to form tacky films in adequate amounts.

The preferred solvents are SE-100 and mixtures of SE-100 with diacetone alcohol in which diacetone alcohol predominates. Surprisingly, diacetone alcohol alone, and mixtures of diacetone alcohol and SE-100 alone in which SE-100 predominates, are less suitable. As illustrated by Example XIX above, diacetone alcohol alone does not form a satisfactory stable dispersion with the latex.

The following examples, summarized in Table II below, illustrate the variations in results obtained with different solvents using the preferred polymer composition of 72 parts by weight of n-butyl methacrylate, 23 parts by weight of methyl methacrylate and 5 parts by weight of acrylic acid. In Table II, the amounts of polymer, water and solvent are given in weight percent based on total composition. The following abbreviations are employed to designate the various solvents:

SE-100 = Solvesso 100
DAA = Diacetone Alcohol
BCA = Butyl Cellosolve Acetate
C = Cellosolve
CA = Cellosolve Acetate
MCA = Methyl Cellosolve Acetate In each of the examples in Table II, the composition was coated with a paint roller on a nine-foot square aluminum panel. That coating was dried for two hours and a second coating was applied. After drying the second coating, the properties of the coated surface were observed for suitability as a seamless flooring. In every instance, a good clear continuous hard film was formed. The levelling properties of the compositions in forming the coated panels are listed in Table II as 3, meaning good levelling; 2, fair levelling, and 1, poor levelling. The stability of the compositions in the liquid latex dispersion form is recorded as 3, good; 2, fair; and 1, poor with some sedimentation.

In Examples XXIV through XXXII, clear films with no noticable color were formed. In Example XXXIII, however, the latex turned brown.

TABLE II

| Example | Polymer | Water | SE-100 | DAA | BCA | C | Stability | Levelling |
|---------|---------|-------|--------|-----|-----|---|-----------|-----------|
| XXIV    | 34      | 51    | 5      | 10  |     |   | 3         | 3         |
| XXV     | 34      | 51    | 15     |     |     |   | 3         | 3         |
| XXVI    | 34      | 51    | 7.5    | 7.5 |     |   | 1         | 3         |
| XXVII   | 34      | 51    | 10     | 5   |     |   | 1         | 2         |
| XXVIII  | 33      | 49.5  |        | 17.5|     |   | 2         | 2         |
| XXIX    | 34      | 51    |        | 15  |     |   | 1         | 1         |
| XXX     | 34      | 51    |        | 7.5 | 7.5 |   | 1         | 3         |
| XXXI    | 34      | 51    | 7.5    |     | 7.5 |   | 1         | 3         |
| XXXII   | 33      | 49.5  |        | 15  | 2.5 |   | 1         | 3         |
| XXXIII  | 34      | 51    |        | 7.5 |     | 7.5 | 1       | 3         |

With reference to Example XXV, more than 15 percent by weight of SE-100 can be used as the solvent. However, about one-half of one percent of a surfactant, such as an anionic surfactant like sodium lauryl sulphate, or a non-ionic surfactant like Igepal CO-610, should be added. When that is done, up to 25 percent by weight of SE-100 can be used with good results.

Table III below illustrates further variations in solvents that did not produce satisfactory results. The same procedure was followed as described for the examples listed in Table II, and the same notation is employed, with one exception. The symbol 0 under "stability" in Table III means that the polymer was to some extent precipitated by the solvent. Abbreviations for solvents given in Table III are as follows:

SE-150 = Solvesso 150, a naptha boiling in the range of 370° to 410° F. as made by the Humble Oil Corporation.
C = Cellosolve
CA = Cellosolve Acetate
MCA = Methyl Cellosolve Acetate In each of the examples listed in Table III a good film was formed on the test panel. However, the other properties were not suitable, as indicated. As in Example XXXIII, in which cellosolve was also employed, the latices in Examples XXXIV and XXXV turned brown.

TABLE III

| Example  | Polymer | Water | SE-150 | C  | CA | MCA | Stability | Levelling |
|----------|---------|-------|--------|----|----|----|-----------|-----------|
| XXXIV    | 34      | 51    |        | 15 |    |    | 1         | 1         |
| XXXV     | 32      | 48    |        | 20 |    |    | 1         | 1         |
| XXXVI    | 33      | 49.5  | 17.5   |    |    |    | 1         | 1         |
| XXXVII   | 34      | 51    |        |    | 15 |    | 0         | —         |
| XXXVIII  | 34      | 51    |        |    |    | 15 | 0         | —         |

Figure 4:
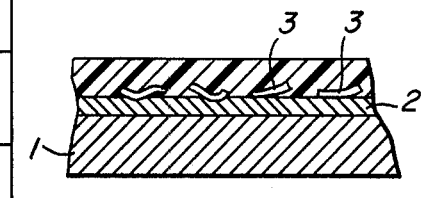
FIG. 4 is a schematic cross-sectional elevational view on an enlarged scale of a portion of a seamless floor formed in accordance with my invention.

Referring now to FIG. 4, I have shown schematically a section through seamless flooring prepared in accordance with my invention. The flooring is supplied to a suitable substrate 1, such as plywood or the like, with a conventional paint roller.

To the substrate 1 is first applied a sealing and coloring coat 2, which may be any conventional sealer, such as shellac or the like, including conventional pigment to produce a desired background color for the finished flooring. If desired, the sealer may be made by adding pigment and filling compounds to the same latex used for the clear coats in accordance with my invention.

Figure 5:
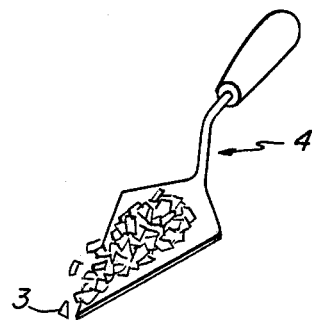
FIG. 5 is a sketch illustrating one step in the preparation of a floor in accordance with my invention.
Figure 6:
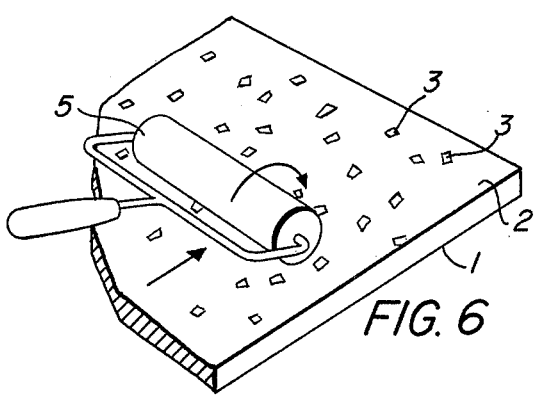
FIG. 6 is a sketch illustrating another step in the manufacture of seamless flooring in accordance with my invention.

Referring to FIG. 5, when the sealing coat 2 is still wet, plastic chips 3 are sprinkled over it in any convenient manner, here suggested as with the aid of a trowel 4. The chips may be more or less densely distributed, as desired for the ultimate decorative effect to be produced. Chips of various colors may be employed.

After the chips have been sprinkled on, the sealing layer 2 and the chips 3 are married, or brought into more intimate mutual contact, by rolling with a paint roller 5. The surface is then allowed to dry. Preferably, the dry surface is sanded, to remove projecting pieces of paint chip, and then vacuumed to remove the sanding debris.

Next, a coating of clear latex is applied with a roller, the latex being made in accordance with my invention as described herein, and allowed to dry. Alternatively, the pigmenting and sealing coat 2 can be rolled on, allowed to dry, and the first coat of clear latex applied. The chips are then put on the clear latex coat while it is wet, and the procedure otherwise continued as described above.

Three further coats of clear latex are then rolled on, each being allowed to dry before the next is applied. Each roll coat will be approximately 8 to 10 10 mils in wet thickness, and the total dried thickness of the flooring should be between 25 and 35 mils, not including the thickness of the baseboard 1.

The following examples, summarized in Table IV below, illustrate the practice of my invention as applied to 3 foot by 3 foot panels of which seamless flooring was produced in the manner described above. Each such panel was divided into four quadrants with masking tape.

In each quadrant, a base coat was applied consisting of the latex given in the example to which a white pigment was added, and colored plastic chips were sprinkled into the wet base coat. After drying, two coats of clear latex were applied with intermediate drying. Twenty-four hours after the last coat was applied, the panels were placed in a corridor subject to moderate traffic for two months.

The panels were periodically rotated 90 degrees to expose each quadrant to similar wear conditions. Floor wear in each of Examples XXXIX through L was evaluated as "good" on the basis that the test panels exhibited the properties of low dirt pickup, easy cleanup, no discoloration, and retained gloss.

In Examples VL through L, in which vinyl acetate was employed, a tendency for the film to yellow was noted, although in other respects the results were good. As indicated, film formation was rated as "fair" or "good".

In the examples given in Table IV, the solvent used was Solvesso 100. The coating composition was in each case made from 34 parts by weight of polymer, 51 parts by weight of water, and 15 parts by weight of Solvesso 100. The composition of the polymer in each example is given in parts by weight of the monomers from which it was made, and the approximate glass transition temperature Tg of the polymer is given in degrees centigrade.

TABLE IV

| Example | n-BMA | MMA | AA | MAA | VA | Tg | Film |
|---------|-------|-----|----|----|----|----|------|
| XXXIX | 62 | 37 | | 1 | | 47 | Fair |
| XL | 67 | 32 | | 1 | | 43 | " |
| XLI | 72 | 25 | | 3 | | 40 | " |
| XLII | 69 | 26 | 5 | | | 42 | Good |
| XLIII | 72 | 23 | 5 | | | 39 | " |
| XLIV | 72 | 26 | 2 | | | 39 | " |
| VL | 36 | 47 | 2 | | 15 | 53 | " |
| IVL | 46 | 37 | 2 | | 15 | 49 | " |
| IIIL | 56 | 27 | 2 | | 15 | 42 | " |
| IIL | 41 | 37 | 2 | | 20 | 51 | " |
| IL | 56 | 24 | 5 | | 15 | 42 | " |
| L | 56 | 29 | 5 | | 10 | 45 | " |

In Table IV above, the following abbreviations are employed:

n-BMA = n-butyl methacrylate
NMA = methyl methacrylate
AA = acrylic acid
MAA = methacrylic acid
VA = vinyl acetate The following examples, summarized in Table V below, illustrate compositions that did not prove useful for the purposes of my invention. The procedure was as described above in connection with the examples summarized in Table IV. The same percentages by weight of polymer, water and Solvesso 100 were used as in the examples in Table IV.

The following additional abbreviation is employed:

EA = ethyl acrylate

TABLE VI

| Example | n-BMA | STY | MAA | 2-EHA | IBA | BA | EA | Tg | Hardness Development |
|---------|-------|-----|-----|-------|-----|----|----|----|----------------------|
| LIII | 26 | 61 | 1 | 12 | | | | 42 | Poor |
| LIV | 24 | 56 | 1 | | 19 | | | 42 | " |
| LV | 25 | 57 | 1 | | | 17 | | 42 | " |
| LVI | 22 | 52 | 1 | | | | 25 | 43 | " |
| LVII | 65 | 34 | 1 | | | | | 43 | Good |
| LVIII | 67 | 32 | 1 | | | | | 43 | " |

In Example LI, high initial dirt pickup caused the floor wear to be rated as poor. In Example LII, a foggy film was formed, so that floor wear was not evaluated.

In Table VI below, several examples are given of other polymers that were tested for fast film hardness development. The compositions given were made into coating compositions consisting of 34 parts by weight of polymer, 51 parts by weight of water, 15 parts by weight of Solvesso 100. Hardness developarent is rated as poor; i.e., too slow for the purposes of my invention, or good; i.e., suitable for use in the practice of my invention. It is noted that various acrylates were tried, and all failed to produce useful films. The following additional abbreviations are used in Table VI:

2-EMA = 2-ethyl hexyl acrylate
IBA = i-butyl acrylate
BA = butyl acrylate
STY = styreno

| Example | n-BMA | MMA | AA | VA | EA | Tg | Film | Floor Wear |
|---------|-------|-----|----|----|----|----|------|-----------|
| LI | | 56.5 | 2 | 15 | 26.5 | 49 | Good | Poor |
| LII | 26 | 57 | 2 | 15 | | 66 | Foggy | Not les- |

-continued

| Example | n-BMA | MMA | AA | VA | EA | Tg | Film | Floor Wear tested |
|---|---|---|---|---|---|---|---|---|

While I have described my invention with respect to the details of various illustrate embodiments, many changes and variations will occur to those skilled in the art upon reading my description, and such can be obviously made without departing from the scope of my invention.

Having thus described my invention, what I claim is:

1. A film-forming composition, consisting essentially of an aqueous emulsion of:

an emulsion polymer of a major proportion of monomer selected from the class consisting of methyl methacrylate and butyl methacrylate and a minor proportion of an unsaturated monocarboxylic acid monomer capable of rendering said monomer in major proportion more hydrophilic and stabilizing said aqueous emulsion, the monomers being copolymerized by emulsion polymerization to a molecular weight in the range of from the order of $4 \times 10^5$ to the order of $2 \times 10^6$ and exhibiting a glass transition temperture in the range of 35° C to 55° C, and a plasticizing solvent for the emulsion polymer having a boiling point between about 212° F to 400° F, said polymer when applied as a film at a wet thickness of about 3 mil developing a Sward hardness in the range of 25 to 45 in 18 hours or less.

2. The film-forming composition of claim 1 wherein said unsaturated monocarboxylic acid monomer is selected from the class consisting of acrylic acid and methacrylic acid.

3. The film-forming composition of claim 1 wherein: said minor proportion monomer is methacrylic acid.

4. The film-forming composition of claim 1 wherein: said major proportion of monomer consists of major proportion of n-butyl methacrylate and a minor proportion of methyl metacrylate.

5. The film-forming composition of claim 1 wherein: said solvent is a mixture of a major proportion of diacetone alcohol and a minor proportion of a high boiling point naphtha boiling in the range from 300° F to 400° F.

6. A film-forming composition of claim 1 wherein said solvent is selected from the group consisting of high boiling point naphthas, xylene, toluene, 2,6-dimethyl-4-heptanol, $CH_3COOC_2H_4OC_4H_9$, and mixtures of high boiling point naphthas and diacetone alcohol, said solvent being sufficient to render the emulsion polymer film-forming when the emulsion polymer is applied to a surface and is allowed to evaporate at room temperture.

* * * * *

UNITED STATES PATENT OFFICE
CERTIFICATE OF CORRECTION

Patent No. 4,100,125         Dated July 11, 1978

Inventor(s) Michael Pezzuto, Jr.

It is certified that error appears in the above-identified patent and that said Letters Patent are hereby corrected as shown below:

Column 3; line 29, "chip" should be "chips".
Column 6; line 68, "Carbitol" should read "Carbinol".
Column 7; line 16, before "cellosolve" (first occurrence) insert --butyl--;
   same line, after "acetate" insert --(CH$_3$COOC$_2$H$_4$OC$_4$H$_9$)--;
   same line, after "parts of" insert --butyl--;
   line 17, cancel "carbitol" and substitute --carbinol (2,6-dimethyl-4-heptanol)--;
   line 18, "celluosolve" should read "cellosolve";
   line 44, "satisfactory" should read "satisfactorily".
Column 9; line 26, after "10" cancel "10".
Column 10; Table VI appearing at lines 35-44 should appear at lines 65-68 while the Table appearing at lines 65-68 should appear at lines 35-44;
   line 59; "2-EMA" should read "2-EHA";
   line 68, in the Table "les-" should read "tes-".
Column 11; line 8, "Illustrate" should read "illustrative".
Column 12; claim 4, line 11, after "consists of" insert --a--;
   claim 6, line 28, "temperture" should read "temperature".

Signed and Sealed this

Twenty-second Day of May 1979

[SEAL]

Attest:

RUTH C. MASON
Attesting Officer

DONALD W. BANNER
Commissioner of Patents and Trademarks